(12) United States Patent
Tsujimoto

(10) Patent No.: US 9,224,193 B2
(45) Date of Patent: Dec. 29, 2015

(54) FOCUS STACKING IMAGE PROCESSING APPARATUS, IMAGING SYSTEM, AND IMAGE PROCESSING SYSTEM

(75) Inventor: Takuya Tsujimoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 509 days.

(21) Appl. No.: 13/539,936

(22) Filed: Jul. 2, 2012

(65) Prior Publication Data

US 2013/0016885 A1  Jan. 17, 2013

(30) Foreign Application Priority Data

Jul. 14, 2011  (JP) .................................. 2011-155889

(51) Int. Cl.
*G06T 5/00* (2006.01)
*G06T 5/50* (2006.01)

(52) U.S. Cl.
CPC . *G06T 5/003* (2013.01); *G06T 5/50* (2013.01); *G06T 2207/10056* (2013.01); *G06T 2207/20221* (2013.01); *G06T 2207/30024* (2013.01)

(58) Field of Classification Search
None
See application file for complete search history.

(56) References Cited

U.S. PATENT DOCUMENTS

| 7,003,143 B1* | 2/2006 | Hewitt et al. ................ 382/128 |
| 7,596,249 B2* | 9/2009 | Bacus et al. ................ 382/128 |
| 8,009,894 B2 | 8/2011 | Lindberg et al. |
| 8,044,974 B2 | 10/2011 | Sumida et al. |
| 2005/0089208 A1* | 4/2005 | Dong et al. .................. 382/133 |
| 2006/0109343 A1* | 5/2006 | Watanabe et al. ............... 348/79 |
| 2006/0171582 A1 | 8/2006 | Eichhorn ...................... 382/154 |
| 2006/0239534 A1 | 10/2006 | Sumida et al. |
| 2009/0116733 A1* | 5/2009 | Eichhorn et al. .............. 382/154 |
| 2009/0185714 A1 | 7/2009 | Lindberg et al. |
| 2011/0025880 A1* | 2/2011 | Nandy ....................... 348/226.1 |

(Continued)

FOREIGN PATENT DOCUMENTS

| JP | A 2001-211896 | 8/2001 |
| JP | A 2003-141506 | 5/2003 |

(Continued)

OTHER PUBLICATIONS

Price, Jeffrey H. and Gough, David A., "Comparison of Phase-Contrast and Fluorescence Digital Autofocus for Scanning Microscopy," Cytometry 16:283-297, 1994, 15 pages.*

(Continued)

*Primary Examiner* — Sumati Lefkowitz
*Assistant Examiner* — Ryan P Potts
(74) *Attorney, Agent, or Firm* — Fitzpatrick, Cella, Harper & Scinto

(57) ABSTRACT

An image processing apparatus comprises: an image acquisition unit for acquiring a plurality of original images acquired by imaging a specimen including a structure in various focal positions using a microscope apparatus; an image generation unit for generating, on the basis of the plurality of original images, a first image on which blurring of an image of the structure has been reduced in comparison with the original images; and an analysis unit for obtaining information relating to the structure included in the first image by applying image analysis processing to the first image. The image generation unit selects a part of the original images having focal positions included within a smaller depth range than a thickness of the specimen from the plurality of original images obtained from the specimen, and generates the first image using the selected original images.

20 Claims, 11 Drawing Sheets

(56) References Cited

U.S. PATENT DOCUMENTS

| | | | |
|---|---|---|---|
| 2011/0128295 A1 | 6/2011 | Kimoto et al. | 345/589 |
| 2011/0142356 A1 | 6/2011 | Uemori et al. | 382/233 |
| 2012/0176489 A1 | 7/2012 | Oshiro et al. | 348/80 |

FOREIGN PATENT DOCUMENTS

| | | |
|---|---|---|
| JP | 2005-037902 A | 2/2005 |
| JP | A 2006-067521 | 3/2006 |
| JP | 2006-300681 A | 11/2006 |
| JP | A 2008-533554 | 8/2008 |
| JP | 2009-223164 A | 10/2009 |
| JP | 2009223164 A * | 10/2009 |
| JP | 2011-510292 A | 3/2011 |
| JP | A 2011-059515 | 3/2011 |
| JP | A 2011-123311 | 6/2011 |
| JP | A 2011-133849 | 7/2011 |

OTHER PUBLICATIONS

English translation of JP 2009-223164 A to Yuri et al., 15 pages.*
JPO Office Action issued on Feb. 24, 2015, in counterpart Japanese patent application 2011-155889, with translation.

* cited by examiner

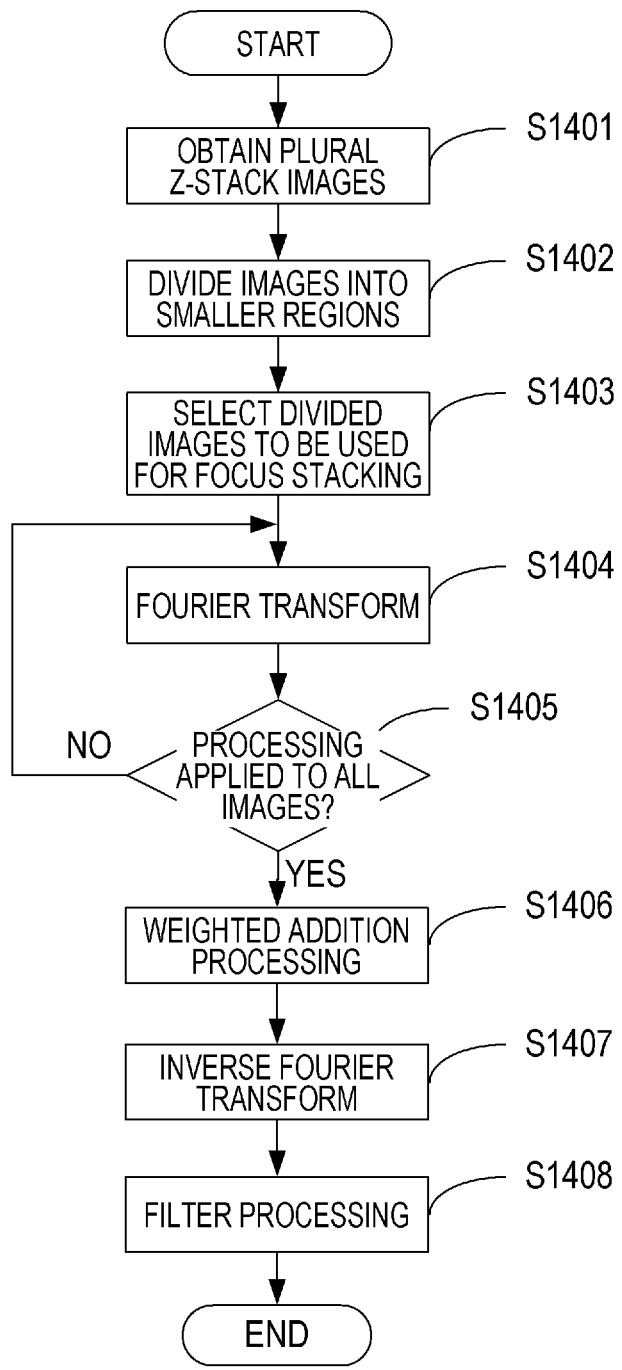

FOCUS STACKING IMAGE PROCESSING APPARATUS, IMAGING SYSTEM, AND IMAGE PROCESSING SYSTEM

BACKGROUND OF THE INVENTION

1. Field of the Invention

This invention relates to an image processing apparatus, an imaging system, and an image processing system, and in particular to a technique for assisting observation of an object with the use of a digital image.

2. Description of the Related Art

Recently, a virtual slide system attracts attention in the field of pathology, as a successor to an optical microscope which is currently used as a tool for pathological diagnosis. The virtual slide system enables pathological diagnosis to be performed on a display by imaging a specimen (a sample) to be observed placed on a slide and digitizing the image. The digitization of pathological diagnosis images with the virtual slide system makes it possible to handle conventional optical microscope images of specimens as digital data. It is expected this will bring about various merits, such as more rapid remote diagnosis, provision of information to patients through digital images, sharing of data of rare cases, and more efficient education and training.

When using a virtual slide system, it is required to digitize an entire image of a specimen to be observed placed on a slide in order to realize equivalent performance to that of an optical microscope. The digitization of the entire image of the specimen makes it possible to examine the digital data generated with the virtual slide system by using viewer software running or a PC or work station. The digitized entire image of the specimen will generally constitute an enormous amount of data, from several hundred million pixels to several billion pixels when represented by the number of pixels.

Even though the amount of data generated by the virtual slide system is enormous, this makes it possible to examine the specimen image either microscopically (in enlarged detail views) or macroscopically (in overall perspective views) by scaling the image with the viewer, which provides various advantages and conveniences. All the necessary information can be preliminarily acquired so that images of any resolution and any magnification can be displayed instantaneously as requested by a user. Further, by performing image analysis on the obtained digital data in order to comprehend a cell shape, calculate a cell count, or calculate an area ratio (an N/C ratio) between cytoplasm and a nucleus, for example, various information useful for pathological diagnosis can also be provided.

Incidentally, an imaging optical system of a virtual slide system is designed with an emphasis on resolving power and therefore has an extremely shallow depth of field. Accordingly, a range in which focus is achieved relative to the thickness of a specimen serving as an object to be imaged is extremely narrow, and therefore images of tissues and cells positioned away from a focal position in a depth direction (a direction along an optical axis of the imaging optical system or a direction perpendicular to an observation surface of a slide) are blurred. It is therefore difficult to observe an entire specimen from a single two-dimensional image. Further, in an image including a large amount of blur, the precision of characteristic amount extraction and image recognition decreases, leading to a reduction in the reliability of image analysis performed by a computer.

An image processing method known as focus stacking is available as a method of solving this problem. Focus stacking is a method of generating an image having a deep depth of field from a plurality of images obtained by imaging an object in various focal positions. Japanese Patent Application Publication No. 2005-037902, for example, discloses a system in which a deep-focus image is generated by dividing images having different focal positions respectively into a plurality of sections and performing focus stacking in each section.

According to the method disclosed in Japanese Patent Application Publication No. 2005-037902, an image that is in focus as a whole and includes little blur can be obtained. However, although this type of deep-focus image is useful for rough observation of the specimen as a whole, it is not suitable for detailed observation of a part of the specimen or comprehension of a three-dimensional structure and a three-dimensional distribution of tissues, cells, and so on. The reason for this is that when focus stacking is performed, depth direction information is lost, and therefore a user cannot determine front-rear relationships between respective structures (cells, nuclei, and so on) in the image simply by viewing the image. Further, when structures originally existing in different depth direction positions are overlapped on the image at an identical contrast, it is difficult to separate and identify the structures not merely through visual observation but even through image analysis using a computer.

SUMMARY OF THE INVENTION

The present invention has been designed in view of these problems, and an object thereof is to provide a technique for preserving depth direction information relating to a specimen so that the specimen can be observed using a digital image, and generating an image suitable for image analysis processing using a computer.

The present invention in its first aspect provides an image processing apparatus comprising: an image acquisition unit for acquiring a plurality of original images acquired by imaging a specimen including a structure in various focal positions using a microscope apparatus; an image generation unit for generating, on the basis of the plurality of original images, a first image on which blurring of an image of the structure has been reduced in comparison with the original images; and an analysis unit for obtaining information relating to the structure included in the first image by applying image analysis processing to the first image, wherein the image generation unit selects a part of the original images having focal positions included within a smaller depth range than a thickness of the specimen from the plurality of original images obtained from the specimen, and generates the first image using the selected original images.

The present invention in its second aspect provides an imaging system comprising: a microscope apparatus for obtaining a plurality of original images by imaging a specimen including a structure in various focal positions; and the image processing apparatus according to the first aspect, which obtains the plurality of original images from the microscope apparatus.

The present invention in its third aspect provides an image processing system comprising: an image server for storing a plurality of original images obtained by imaging a specimen including a structure in various focal positions; and the image processing apparatus according to the first aspect, which obtains the plurality of original images from the image server.

The present invention in its fourth aspect provides a computer program stored on a non-transitory computer readable medium, the program causing a computer to perform a method comprising the steps of: acquiring a plurality of original images acquired by imaging a specimen including a structure in various focal positions using a microscope apparatus;

generating, on the basis of the plurality of original images, a first image on which blurring of an image of the structure has been reduced in comparison with the original images; and acquiring information relating to the structure included in the first image by applying image analysis processing to the first image, wherein, in the image generation step, a part of the original images having focal positions included within a smaller depth range than a thickness of the specimen is selected from the plurality of original images obtained from the specimen, and the first image is generated using the selected original images.

According to this invention, depth direction information relating to a specimen can be preserved so that the specimen can be observed using a digital image, and an image suitable for image analysis processing by a computer can be generated.

Further features of the present invention will become apparent from the following description of exemplary embodiments with reference to the attached drawings.

BRIEF DESCRIPTION OF THE DRAWINGS

FIG. 11 is a flowchart showing a flow of focus stacking processing according to a third embodiment.

DESCRIPTION OF THE EMBODIMENTS

First Embodiment

Figure 1:
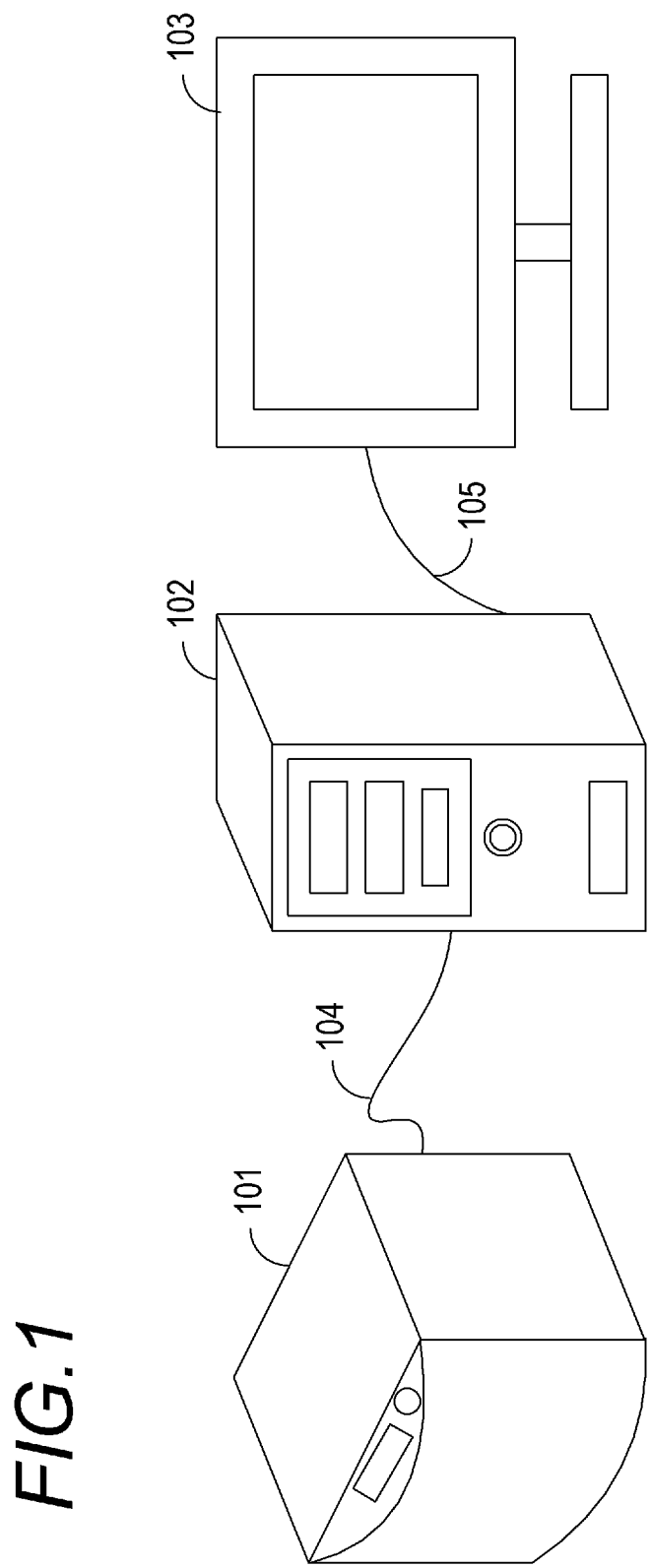
FIG. 1 is an overall view showing a layout of apparatuses in an imaging system according to a first embodiment.

FIG. 1 is an overall view showing a layout of apparatuses in an imaging system according to a first embodiment of the invention.

The imaging system according to the first embodiment is composed of an imaging apparatus (microscope apparatus) 101, an image processing apparatus 102, and a display device 103, and is a system with a function to acquire and display a two-dimensional image of a specimen (a test sample) as an object to be imaged. The imaging apparatus 101 and the image processing apparatus 102 are connected to each other with a dedicated or general-purpose I/F cable 104. The image processing apparatus 102 and the display device 103 are connected to each other with a general-purpose I/F cable 105.

The imaging apparatus 101 is a virtual slide apparatus having a function of acquiring a plurality of two-dimensional images at different focal positions in an optical axis direction and outputting digital images. The acquisition of the two-dimensional images is done with a solid-state imaging device such as a CCD (Charge Coupled Device) or CMOS (Complementary Metal Oxide Semiconductor). Alternatively, the imaging apparatus 101 may be formed by a digital microscope apparatus having a digital camera attached to an eye piece of a normal optical microscope, in place of the virtual slide apparatus.

The image processing apparatus 102 is an apparatus having a function for generating an analysis image suitable for image analysis from a plurality of original images obtained from the imaging apparatus 101, a function for generating an observation image suitable for visual observation, a function for applying image analysis processing to the analysis image, and so on. The image processing apparatus 102 is formed by a general-purpose computer or work station having hardware resources such as a CPU (central processing unit), a RAM, a storage device, an operation unit, and an I/F. The storage device is a mass information storage device such as a hard disk drive, in which a program for executing processing steps to be described later, data, an OS (operating system), and so on are stored. The above-mentioned functions are realized by the CPU downloading a program and data required for the RAM from the storage device and executing the program. The operation unit is formed by a keyboard or a mouse, and is used by an operator to input various types of instructions. The display device 103 is a monitor which displays an image for observation and an image analytical result obtained by the arithmetic processing done by the image processing apparatus 102, and is formed by a CRT, a liquid-crystal display, or the like.

Although in the example show in FIG. 1, the imaging system consists of three components: the imaging apparatus 101, the image processing apparatus 102, and the display device 103, the invention is not limited to this configuration. For example, the image processing apparatus may be integrated with the display device, or the functions of the image processing apparatus may be incorporated in the imaging apparatus. Further, the functions of the imaging apparatus, the image processing apparatus and the display device can be realized by a single apparatus. Conversely, the functions of the image processing apparatus and the like can be divided so that they are realized by a plurality of apparatuses or devices.

(Configuration of Imaging Apparatus)

Figure 2:
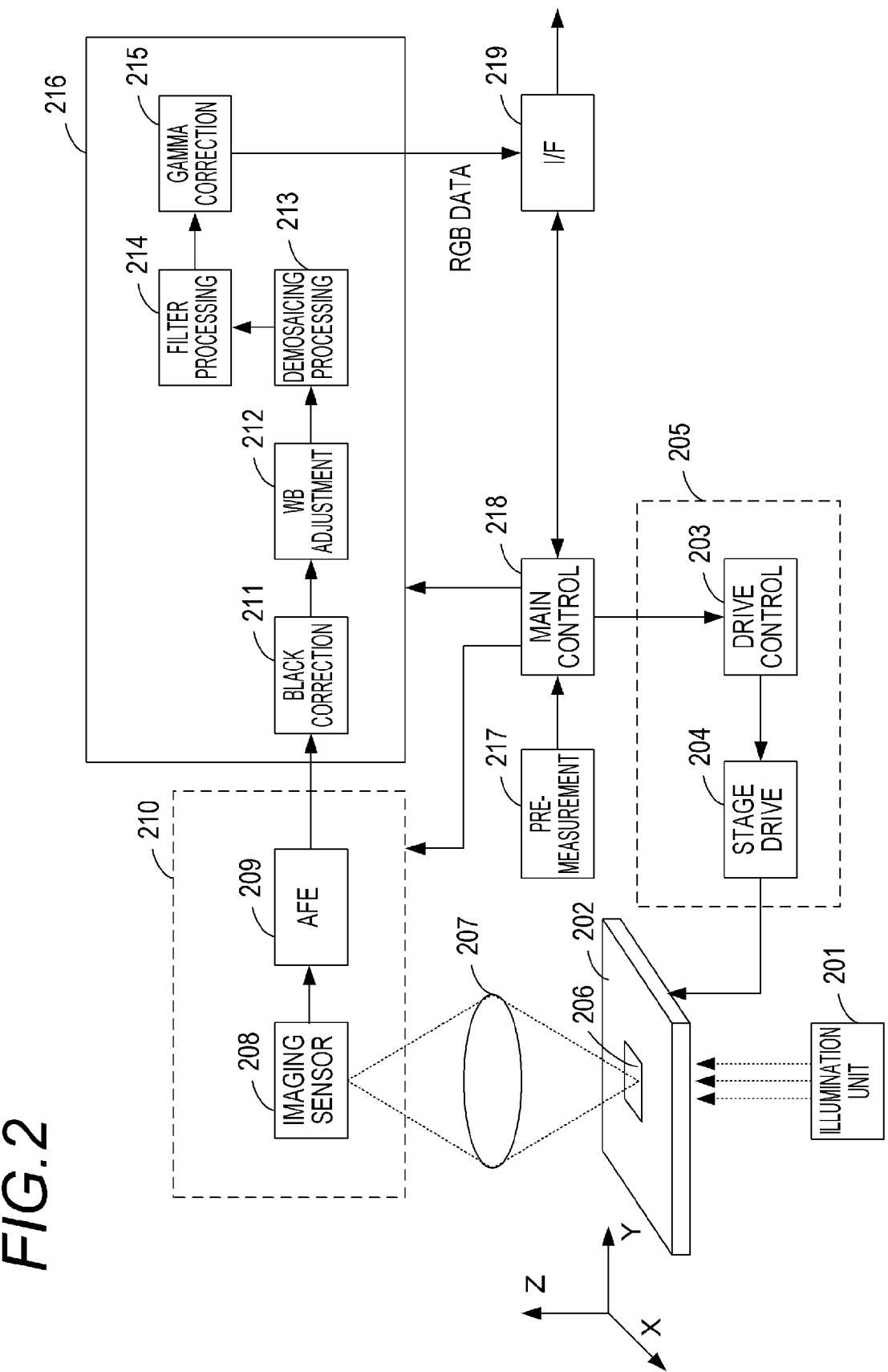
FIG. 2 is a functional block diagram of an imaging apparatus according to the first embodiment.

FIG. 2 is a block diagram illustrating a functional configuration of the imaging apparatus 101.

The imaging apparatus 101 is schematically composed of an illumination unit 201, a stage 202, a stage control unit 205, an imaging optical system 207, an imaging unit 210, a development processing unit 216, a pre-measurement unit 217, a main control system 218, and an external interface 219.

The illumination unit 201 is means for irradiating a slide 206 placed on the stage 202 with uniform light, and is composed of a light source, an illumination optical system, and a drive control system for the light source. The stage 202 is drive-controlled by the stage control unit 205, and is movable along three axes of X, Y, and Z. The optical axis direction shall be defined as the Z direction. The slide 206 is a member in which a tissue section or smeared cell to be examined is applied on a slide glass and encapsulated under a cover glass together with an encapsulant.

The stage control unit 205 is composed of a drive control system 203 and a stage drive mechanism 204. The drive control system 203 performs drive control of the stage 202 in accordance with an instruction received from the main control system 218. A direction and amount of movement, and so on of the stage 202 are determined based on position information and thickness information (distance information) on the specimen obtained by measurement by the pre-measurement unit 217 and a instruction from the user. The stage drive mechanism 204 drives the stage 202 according to the instruction from the drive control system 203.

The image-formation optical system 207 is a lens group for forming an optical image of the specimen in the preparation 206 on an imaging sensor 208.

The imaging unit 210 is composed of the imaging sensor 208 and an analog front end (AFE) 209. The imaging sensor 208 is a one-dimensional or two-dimensional image sensor for converting a two-dimensional optical image into an electric physical amount by photoelectric conversion, and a CCD or CMOS, for example is used as the imaging sensor 208. When the imaging sensor 208 is a one-dimensional sensor, a two-dimensional image can be obtained by scanning the image in a scanning direction. The imaging sensor 208 outputs an electrical signal having a voltage value according to an intensity of light. When a color image is desired as a captured image, a single-plate image sensor having a Bayer arrangement color filter attached thereto can be used.

The AFE 209 is a circuit for converting an analog signal output from the imaging sensor 208 into a digital signal. The AFE 209 is composed of an H/V driver, a CDS, an amplifier, an AD converter, and a timing generator as described later. The H/V driver converts a vertical synchronizing signal and horizontal synchronizing signal for driving the imaging sensor 208 into a potential required to drive the sensor. The CDS (correlated double sampling) is a correlated double sampling circuit for removing noise from fixed pattern. The amplifier is an analog amplifier for adjusting gain of the analog signal the noise of which has been removed by the CDS. The AD converter converts an analog signal into a digital signal. When the final stage output of the system has eight bits, the AD converter converts an analog signal into digital data which is quantized to about 10 to 16 bits in consideration of processing to be done in the subsequent stage, and outputs this digital data. The converted sensor output data is referred to as RAW data. The RAW data is subjected to development processing in the subsequent development processing unit 216. The timing generator generates a signal for adjusting timing of the imaging sensor 208 and timing of the subsequent development processing unit 216.

When a CCD is used as the imaging sensor 208, the AFE 209 described above is indispensable. However, when a CMOS image sensor capable of digital output is used as the imaging sensor 208, the sensor includes the functions of the AFE 209. Although not shown in the drawing, an imaging control unit for controlling the imaging sensor 208 is provided. This imaging control unit performs not only control of operation of the imaging sensor 208 but also control of operation timing such as shutter speed, frame rate, and ROI (Region of Interest).

The development processing unit 216 is composed of a black correction unit 211, a white balance adjustment unit 212, a demosaicing processing unit 213, a filter processing unit 214, and a γ correction unit 215. The black correction unit 211 performs processing to subtract black-correction data obtained during light shielding from each pixel of the RAW data. The white balance adjustment unit 212 performs processing to reproduce desirable white color by adjusting the gain of each color of RGB according to color temperature of light from the illumination unit 201. Specifically, white balance correction data is added to the black-corrected RAW data. This white balance adjustment processing is not required when a monochrome image is handled.

The demosaicing processing unit 213 performs processing to generate image data of each color of RGB from the RAW data of Bayer arrangement. The demosaicing processing unit 213 calculates a value of each color of RGB for a pixel of interest by interpolating values of peripheral pixels (including pixels of the same color and pixels of other colors) in the RAW data. The demosaicing processing unit 213 also performs correction processing (complement processing) for defective pixels. The demosaicing processing is not required when the imaging sensor 208 has no color filter and an image obtained is monochrome.

The filter processing unit 214 is a digital filter for performing suppression of high-frequency components contained in an image, noise removal, and enhancement of feeling of resolution. The γ correction unit 215 performs processing to add an inverse to an image in accordance with gradation representation capability of a commonly-used display device, or performs gradation conversion in accordance with human visual capability by gradation compression of a high brightness portion or dark portion processing. Since an image is acquired for the purpose of morphological observation in the present embodiment, gradation conversion suitable for the subsequent image combine processing or display processing is performed on the image.

Development processing functions in general include color space conversion for converting an RGB signal into a brightness color-difference signal such as a YCC signal, and processing to compress mass image data. However, in this embodiment, the RGB data is used directly and no data compression is performed.

Although not shown in the drawings, a function of peripheral darkening correction may be provided to correct reduction of amount of light in the periphery within an imaging area due to effects of a lens group forming the imaging optical system 207. Alternatively, various correction processing functions for the optical system may be provided to correct various aberrations possibly occurring in the imaging optical system 207, such as distortion correction for correcting positional shift in image formation or magnification color aberration correction to correct difference in magnitude of the images for each color.

The pre-measurement unit 217 is a unit for performing pre-measurement as preparation for calculation of position information of the specimen on the slide 206, information on distance to a desired focal position, and a parameter for adjusting the amount of light attributable to the thickness of the specimen. Acquisition of information by the pre-measurement unit 217 before main measurement makes it possible to perform efficient imaging. Further, designation of positions in which to start and terminate imaging (a focal position range) and an imaging interval (an interval between focal positions; also referred to as a Z interval) when obtaining images having different focal positions is also performed on the basis of the information generated by the pre-measurement unit 217. A two-dimensional imaging sensor having a lower resolving power than the imaging sensor 208 is used to obtain position information relating to a two-dimensional plane. The pre-measurement unit 217 learns the position of the specimen on an XY plane from the obtained images. A laser displacement meter or a measurement instrument employing a Shack-Hartmann method is used to obtain distance information and thickness information. A method of obtaining the specimen thickness information will be described below.

The main control system 218 has a function to perform control of the units described so far. The functions of the main control system 218 and the development processing unit 216 are realized by a control circuit having a CPU, a ROM, and a RAM. Specifically, a program and data are stored in the ROM, and the CPU executes the program using the RAM as a work memory, whereby the functions of the main control system 218 and the development processing unit 216 are realized. The ROM may be formed by a device such as an EEPROM or flush memory, and the RAM may be formed by a DRAM device such as a DDR3.

The external interface 219 is an interface for transmitting an RGB color image generated by the development processing unit 216 to the image processing apparatus 102. The imaging apparatus 101 and the image processing apparatus 102 are connected to each other through an optical communication cable. Alternatively, an interface such as a USB or Gigabit Ethernet (registered trademark) can be used.

A flow of imaging processing in the main measurement will be briefly described. The stage control unit 205 positions the specimen on the stage 202 based on information obtained by the pre-measurement such that the specimen is positioned for imaging. Light emitted by the illumination unit 201 passes through the specimen and the imaging optical system 207 thereby forms an image on the imaging surface of the imaging sensor 208. An output signal from the imaging sensor 208 is converted into a digital image (RAW data) by the AFE 209, and this RAW data is converted into a two-dimensional RGB image by the development processing unit 216. The two-dimensional image thus obtained is transmitted to the image processing apparatus 102.

The configuration and processing as described above enable acquisition of a two-dimensional image of the specimen at a certain focal position. A plurality of two-dimensional images with different focal positions can be obtained by repeating the imaging processing by means of the stage control unit 205 while shifting the focal position in a direction of the optical axis (Z direction). A group of images with different focal positions obtained by the imaging processing in the main measurement shall be referred to as "Z-stack images", and two-dimensional images forming the Z-stack images at the respective focal positions shall be referred to as the "layer images" or "original images".

Although the present embodiment has been described in terms of an example in which a single-plate method is used to obtain a color image by means of an image sensor, a three-plate method of obtaining a color image using three RGB image sensors can be used instead of the single-plate method. Alternatively, a triple imaging method can be used in which a single image sensor and a three-color light source are used together and imaging is performed three times while switching the color of the light source.

(Regarding Focus Stacking)

Figure 3:
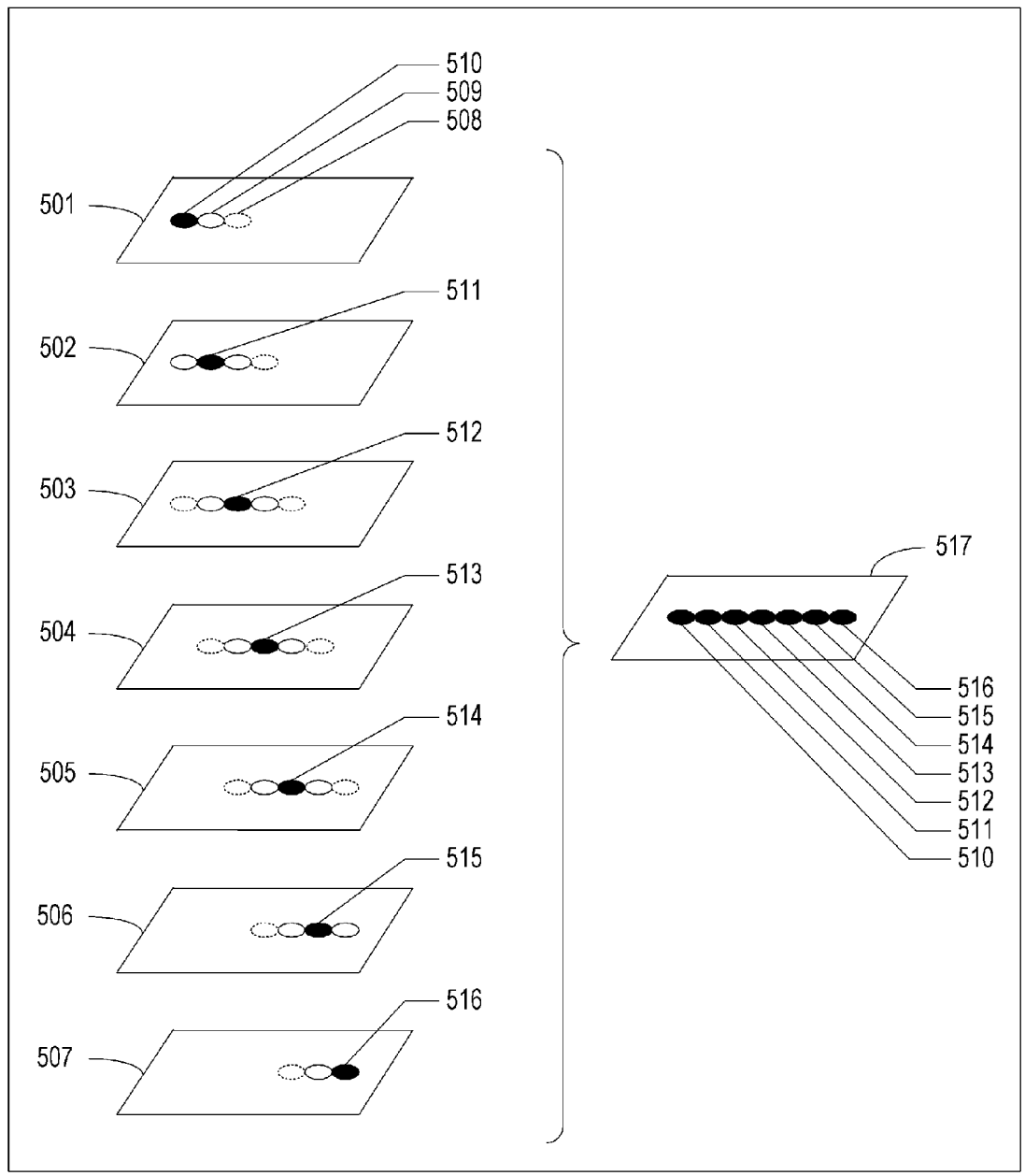
FIG. 3 is a conceptual diagram illustrating focus stacking.

FIG. 3 is a conceptual diagram of focus stacking. The focus stacking processing will be schematically described with reference to FIG. 3. Images 501 to 507 are seven-layer images which are obtained by imaging seven times an object including a plurality of structures at three-dimensionally different spatial positions while sequentially changing the focal position in the optical axis direction (Z direction). Reference numerals 508 to 510 indicate structures contained in the acquired image 501. The structure 508 comes into focus at the focal position of the image 503, but is out of focus at the focal position of the image 501. Therefore, it is difficult to comprehend the configuration of the structure 508 in the image 501. The structure 509 comes into focus at the focal position of the image 502, but is slightly out of focus at the focal position of the image 501. Therefore, it is possible, though not satisfactory, to comprehend the configuration of the structure 509 in the image 501. The structure 510 comes into focus at the focal position of the image 501 and hence the structure thereof can be comprehended sufficiently in the image 501.

In FIG. 3, the structures which are blacked out indicate those in focus, the structures which are white indicate those slightly out of focus, and the structures represented by the dashed lines indicate those out of focus. Specifically, the structures 510, 511, 512, 513, 514, 515, and 516 are in focus in the images 501, 502, 503, 504, 505, 506, and 507, respectively. The description of the example shown in FIG. 3 will be made on the assumption that the structures 510 to 516 are located at different positions in the horizontal direction.

An image 517 is an image obtained by cutting out respective regions of the structures 510 to 516 which are in focus in the images 501 to 507 and merging these regions. By merging the focused regions of the plurality of images as described above, a focus-stacked image which is focused in the entirety of the image can be obtained. This processing for generating an image having a deep depth of field by the digital image processing is referred to also as focus stacking. Further, a method of selecting and merging regions that are in focus and have a high contrast, as shown in FIG. 3, is referred to as a select and merge method. In this embodiment, an example in which focus stacking is performed using this select and merge method will be described. However, another focus stacking method may of course be used.

(Re: Thickness of Specimen)

Figure 4:
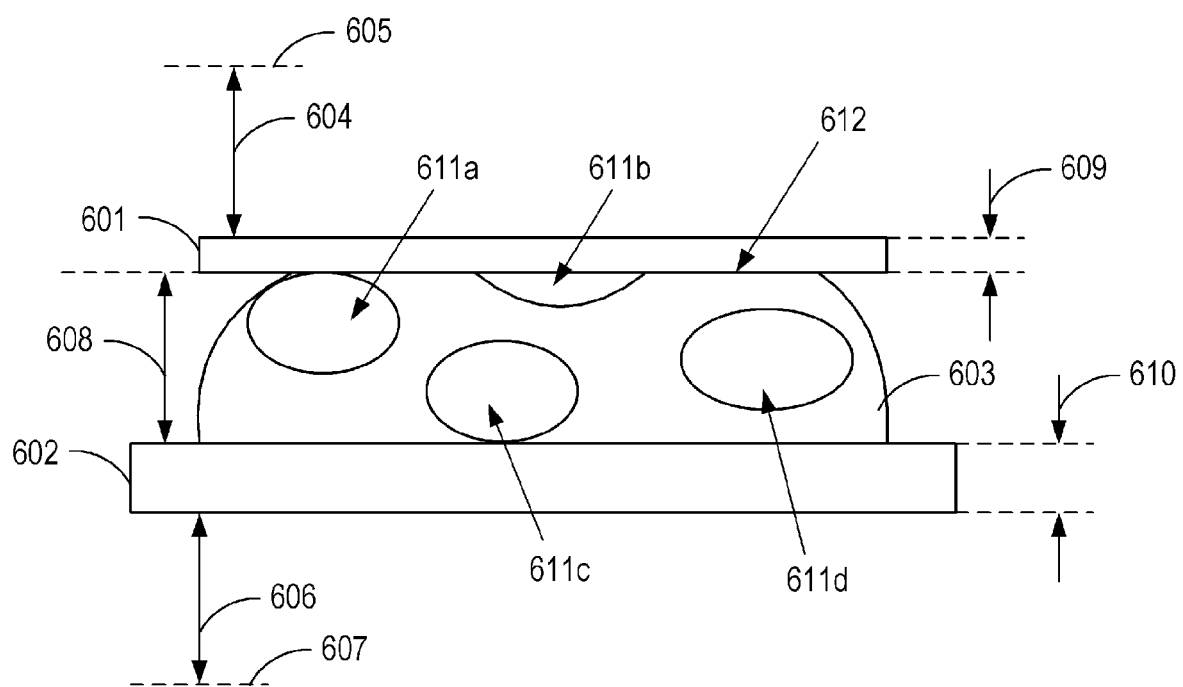
FIG. 4 is a conceptual diagram illustrating a relationship between a specimen and depth and distance information.

FIG. 4 is a conceptual diagram illustrating a relationship between the specimen and the depth and distance information. The concept of a depth range, which is a feature of this embodiment, will now be described using this drawing.

FIG. 4 shows a cross-section of a slide in pattern form. The slide is a structure in which a specimen 603 is fixed between a transparent slide glass 602 and a transparent cover glass 601. A sealant constituted by a transparent adhesive exists between the cover glass 601 and the specimen 603.

604 denotes a distance from a reference position 605 to an upper surface of the cover glass 601. Further, 606 denotes a distance from a reference position 607 to a lower surface of the slide glass 602. These distances 604 and 606 may be measured using a laser displacement meter or the like, for example.

608 denotes a thickness of the specimen 603. It is difficult to measure the specimen thickness 608 directly, and therefore the thickness 608 is preferably calculated by subtracting the distances 604 and 606, a cover glass thickness 609, and a slide glass thickness 610 from an interval between the reference positions 605 and 607. Note that undulation occurs on the cover glass 601 and the slide glass 602 due to a gripping method, the influence of the sealant, and variation in the thickness of the specimen. Therefore, to measure the specimen thickness 608 with a high degree of precision, distance information is preferably obtained in a plurality of positions in a two-dimensional plane (an XY plane), whereupon an average or an intermediate value of the distance information is taken.

The cover glass thickness 609 can be measured or set at a prescribed value registered in advance. When the cover glass thickness 609 is measured, measurement is preferably performed at a plurality of points, taking into account the undulation of the cover glass 601. When a prescribed value is used, on the other hand, it may be assumed that no variation occurs in the thickness of the cover glass 601.

The slide glass thickness 610, similarly to the cover glass thickness 609, can be measured on the basis of the measurement result or set at a prescribed value registered in advance. The slide glass 602 is typically larger than the cover glass 601, and therefore the slide glass thickness 610 may be calculated by measuring a distance from the reference position 605 to an upper surface of the slide glass 602 and subtracting a total value of the measurement result and the distance 606 from the interval between the reference positions 605 and 607.

611a to 611d are structures included in the specimen 603. It is assumed here that 611a to 611d respectively indicate cell nuclei. The nucleus 611b is severed on a perpendicular plane to the optical axis. The nuclei 611b and 611c have different optical axis direction (Z direction) positions (depths) but partially overlap when seen from the optical axis direction (i.e. when projected onto an XY plane).

612 denotes a lower surface of the cover glass 601, or in other words a surface of the specimen 603. By aligning the focal position of the imaging optical system with this position 612, an image of the surface of the specimen 603 can be captured. Note that in reality, undulation of the slide, variation in the thickness of the specimen 603, and so on mean that even when the focal position is aligned with the position 612, the entire surface region of the specimen 603 is not in focus, and in-focus regions intermix with blurred regions. This applies likewise when the focus is aligned with any position on the optical axis. Further, Z direction positions in which structures (cell nuclei, and so on) to be subjected to observation and analysis exist are distributed randomly, as shown in FIG. 4, and it may therefore be impossible to obtain sufficient information for a pathological diagnosis simply by imaging the specimen in a single focal position.

In a conventional system, therefore, a deep-focus image is typically generated by obtaining a plurality of layer images while gradually shifting the focal position within a depth range between the cover glass lower surface and the slide glass upper surface, for example, and performing focus stacking on all of the obtained layer images. However, although image blur can be greatly reduced on a combined image obtained using this method, depth direction information relating to the specimen is completely lost, making it impossible to grasp front-rear relationships (vertical relationships) between the nuclei 611a to 611d. Further, an image of the nucleus 611b overlaps (merges with) an image of the nucleus 611c on the combined image, making it difficult to distinguish between the two nuclei 611b and 611c. When this type of image overlap occurs, an undesirable reduction in precision may occur during image analysis processing such as comprehending cell shapes, calculating a cell count, and calculating an area ratio (an N/C ratio) between the cytoplasm and the nucleus, for example.

Hence, in the system according to this embodiment, a combined image suitable for image analysis is provided by performing focus stacking on an "analysis image" used for image analysis using only a part of the layer images (in a smaller depth range than the thickness of the specimen) rather than all of the layer images. The analysis image is an image on which blur has been reduced appropriately in comparison with the layer images (original images). Further, this system is capable of generating an "observation image" (a second image) suitable for visual observation by a user separately from the analysis image (a first image). The observation image is an image subjected to a smaller degree of blur reduction than the analysis image. In other words, by preserving an appropriate amount of blur in images of structures removed from the focal position on the observation image, the vertical relationships between the structures can be grasped easily in an intuitive manner. Note that when the extent of the blur (in other words, the depth of field) on a layer image is suitable for observation, the layer image serving as an original image may be used as is as the observation image.

Hence, a feature of this system is that an image having an appropriate depth of field (or contrast) is generated automatically in accordance with the application (image analysis by a computer or visual observation by a user), enabling an improvement in user-friendliness.

Here, the analysis image and the observation image differ from each other in the size of the depth range in which the layer images to be used for focus stacking are selected. Specifically, the depth range of the analysis image is larger than the depth range of the observation image. In other words, the number of layer images used for focus stacking is larger in the analysis image than in the observation image. Alternatively, it may be said that the analysis image has a deeper depth of field than the observation image and that the degree of blur reduction is greater (the amount of blur is smaller) in the analysis image than in the observation image. The depth range of the analysis image can be determined appropriately in accordance with the size of the structure to be analyzed or the type of diagnosis (cytological diagnosis or tissue diagnosis). More specifically, the depth range is preferably determined to be approximately equal to the size of the structure (cell, nucleus, or the like) to be identified (detected) during image analysis. In the case of a specimen used for a tissue diagnosis, for example, the size of a nucleus of a normal cell is approximately 3 to 5 µm and the size of a nucleus of an abnormal cell is up to approximately 10 µm, and therefore the depth range is preferably set at not less than 3 µm and not more than 10 µm. When the focal position interval (the Z interval) between layer images is 1 µm and no undulation exists on the cover glass 601, approximately 3 to 10 layer images are used in focus stacking of the analysis image.

(System Operations)

Figure 5:
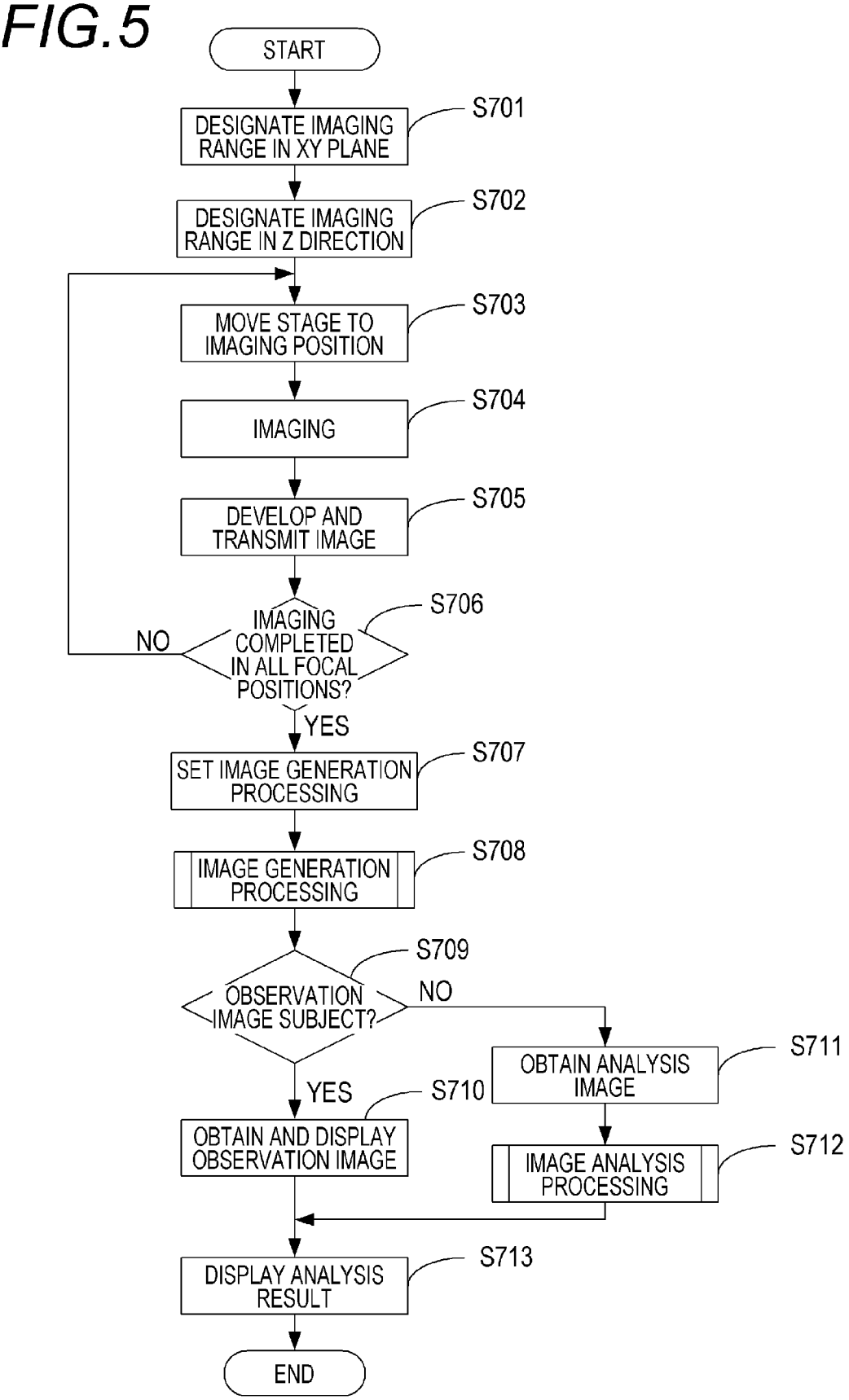
FIG. 5 is a flowchart showing an overall flow of image processing according to the first embodiment.

FIG. 5 is a flowchart showing an overall flow of image processing performed by the imaging system. A flow of processing for capturing the layer images and processing for generating the observation image and the analysis image will now be described using this drawing. It is assumed that the pre-measurement processing is terminated before the main measurement processing, and that a low resolution, XY plane image of the slide is transmitted together with Z direction distance and thickness information to the main control system 218 before the processing shown in FIG. 5 begins.

In Step S701, the main control system 218 detects a range in which the specimen exists from the XY plane image obtained in the pre-measurement using well-known image processing such as edge detection or object recognition. The range detected here is designated as an imaging range of the main measurement. By limiting (reducing) the imaging range on the basis of the result of the pre-measurement in this manner, rather than imaging the entire slide, reductions in a processing time and a data amount can be achieved.

In Step S702, the main control system 218 designates a Z direction imaging range on the basis of the Z direction distance information and thickness information of the slide, obtained in the pre-measurement. More specifically, an imaging start position (the cover glass lower surface, for example), an imaging end position (the slide glass upper surface, for example), and the imaging interval (the Z interval) are preferably designated. The imaging interval can be determined on the basis of the depth of field of the imaging optical system 207. For example, when an image is considered to be in focus within a focal position range of ±0.5 µm (i.e. when the depth of field is 1 µm), the imaging interval is preferably set to be equal to or smaller than 1 µm. The imaging interval may be fixed or varied over the imaging range. For example, the specimen thickness differs between a cytological diagnosis and a tissue diagnosis (several tens of µm in the case of a cytological diagnosis and several µm in the case of a tissue diagnosis), and therefore the imaging interval is preferably set to be wider in the case of a cytological diagnosis than in the case of a tissue diagnosis. By widening the imaging interval, the number of imaging operations decreases, leading to a reduction in the number of obtained layer images, and as a result, the imaging time can be shortened and the data amount can be reduced.

Information relating to the imaging range obtained in Steps S701 and S702 is transmitted respectively to the stage control unit 205, the imaging unit 210, and the development processing unit 216.

Next, a two-dimensional image (a layer image) is captured in each focal position.

First, in Step S703, the stage control unit 205 moves the stage 202 in the X and Y directions to achieve positioning between the imaging range of the specimen and an angle of view of the imaging optical system 207 and the imaging sensor 208. Further, the stage control unit 205 moves the stage 202 in the Z direction to align the focal position on the specimen with the imaging start position.

In Step S704, the illumination unit 201 illuminates the specimen and the imaging unit 210 takes in an image. In this embodiment, a sensor having a Bayer array is envisaged, making it possible to advance to a subsequent operation following a single imaging operation. This applies likewise to a three plate system. In the case of a triple imaging system in which a light source is switched, the light source is switched between R, G, and B in an identical position, and after obtaining the respective images, the routine advances to the next step.

In Step S705, imaging data are processed by the development processing unit 216 to generate an RGB image, whereupon the generated RGB image is transmitted to the image processing apparatus 102. The image is primarily stored in an internal storage of the imaging apparatus 101, whereupon the routine may advance to a transmission step. Through the processing of S703 to S705, a single layer image captured in a single focal position can be obtained.

In Step S706, a determination is made as to whether or not imaging in all focal positions is complete (in other words, whether or not the focal position has reached the imaging end position). When imaging is complete, or in other words when acquisition of all of the layer images is complete, the routine advances to Step S707. When the focal position has not yet reached the imaging end position, the routine returns to S703, where the focal position is shifted by the imaging interval designated in S702 and the next imaging operation is performed. When, for example, the distance between the imaging start position and the imaging end position is 30 μm and the imaging interval is 1 μm, the processing of S703 to S706 is performed 31 times so that 31 layer images are obtained.

In Step S707, the image processing apparatus 102, having received the results of acquisition of all of the layer images, performs various setting operations relating to image generation processing. Here, the number of obtained layer images is learned, and information such as distance information required to generate the observation image and the analysis image and a depth of field range is obtained and set.

In Step S708, the image processing apparatus 102 generates the observation image and the analysis image on the basis of values set in Step S707. This operation will be described in detail below using FIG. 6.

Step S709 onward corresponds to an example of processing using the observation image and the analysis image. In Step S709, the image processing apparatus 102 determines whether to perform processing on the observation image or the analysis image. The routine advances to Step S710 when processing is to be performed on the observation image and to Step S711 when processing is to be performed on the analysis image. Note that in this flowchart, processing of the observation image and processing of the analysis image are executed exclusively, but the two types of processing may be executed in parallel or in sequence.

In Step S710, the image processing apparatus 102 obtains the observation image and displays the obtained observation image on the display device 103. The observation image may be an unprocessed layer image selected either by the user or automatically from the plurality of layer images, or a combined image subjected to focus stacking in the depth direction information acquisition range of S708.

In Step S711, the image processing apparatus 102 obtains the analysis image to be subjected to processing. In Step S712, the image processing apparatus 102 implements image analysis processing on the basis of the selected analysis image. The image analysis processing will be described in detail below using FIG. 8.

In Step S713, the image processing apparatus 102 displays the result of the image analysis processing (S712) on the display device 103. At this time, the analysis result is preferably presented as supplementary information to the observation image displayed in Step S710. The analysis result may be displayed alongside the observation image, overlaid onto the observation image, or displayed in another form.

Note that the flowchart of FIG. 5 illustrates the flow of a series of operations including capture of the layer images and generation, analysis, and display of the observation image and the analysis image. However, the operations of the system are not limited to this example, and for example, the imaging processing of S701 to S706, the image generation processing of S707 to S708, and the analysis/display processing of S709 to S713 may be performed separately at different times. For example, the imaging processing may be executed alone in batches on a plurality of slides housed in a stacker (not shown), whereupon Z-stack images (layer image groups) of the respective slides are stored in an internal storage device of the image processing apparatus 102 or a storage device on a network. As regards the image generation processing and the analysis/display processing, the user can select a desired image from the storage device and perform processing thereon at a desired time.

(Image Generation Processing)

Figure 6:
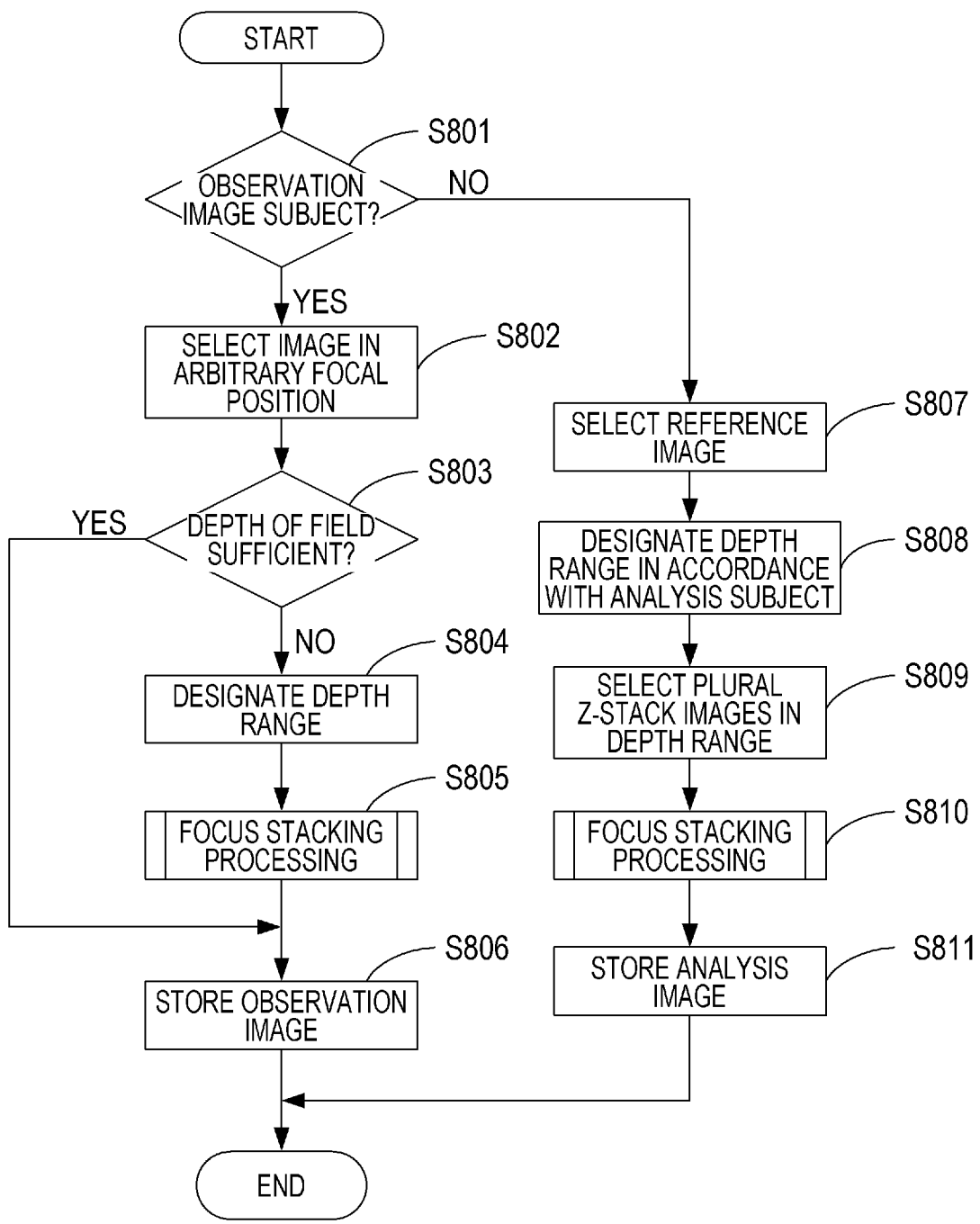
FIG. 6 is a flowchart showing a flow of image generation processing according to the first embodiment.

FIG. 6 is a flowchart showing a flow of the image generation processing. Here, Step S708 of FIG. 5 will be described in detail.

In Step S801, the image processing apparatus 102 determines whether an image generation subject is the observation image or the analysis image. The routine advances to Step S802 in the case of the observation image and to Step S807 in the case of the analysis image. Note that the flowchart illustrates an example in which observation image generation processing and analysis image generation processing are executed exclusively, but in reality, both the observation image and the analysis image are generated, and therefore the two types of generation processing are executed in parallel or in sequence.

(1) Observation Image Generation Processing

In Step S802, the user selects one image from the plurality of layer images corresponding to the plurality of focal positions. For example, the user is asked to designate a focal position or presented with a preview screen on which the plurality of images are arranged and asked to select an image therefrom.

In Step S803, a determination is made as to whether or not the image selected in Step S802 has a sufficient depth of field for visual observation. When the depth of field is sufficient, the routine jumps to Step S806 (in this case, the layer image is used as is as the observation image). When the depth of field is not sufficient, or in other words when the depth information is acknowledged to be incomplete, the routine advances to Step S804. Note that the determination as to whether or not the depth of field is sufficient may be made by the user by viewing a preview of the image.

In Step S804, the user designates the range (depth range) of the layer images used to generate the observation image. At this time, the user may designate either a depth range or a number of images. In a preferable configuration, a plurality of preview images formed by combining two images, three images, and so on may be displayed on the screen, for example, and the user may be asked to select a desired number of combined images. Note that the preview images may be formed from focus-stacked rough images or images created using simpler combining processing (addition, a blending, or the like) than focus stacking.

In Step S805, the image processing apparatus 102 selects the plurality of layer images within the designated depth range and implements focus stacking processing thereon. The focus stacking processing will be described in detail below using FIG. 7.

In Step S806, the image processing apparatus 102 designates the image selected in Step S802 or the focus-stacked image generated in Step S805 as the observation image. The observation image is then stored in the internal storage device of the image processing apparatus 102 or a predetermined storage device on a network.

(2) Analysis Image Generation Processing

In Step S807, the image processing apparatus 102, having learned that the image generation subject is an analysis application, selects an image (to be referred to as a reference image) that is to serve as a reference position during focus stacking from the plurality of layer images. Reference image selection may be performed by the user. Here, the reference position can be set arbitrarily, but the lower surface of the cover glass, or in other words an upper side (an imaging optical system side) surface of the specimen is preferably selected as the reference position. The reason for this is that in a normal image, both structures existing above the focal position (focal surface) and structures existing below the focal position are superimposed onto the image as blurred images, whereas in an image formed by aligning the focal position with the specimen surface, only transparent objects such as the sealant and the cover glass exist above the focal position, and therefore a blur component is halved (i.e. only the lower side structures are blurred). A clear image exhibiting little blur is more suitable for image analysis. Alternatively, when the structure to be analyzed is known, an image on which the structure is most in focus may be selected as the reference image, and when the depth at which analysis is to be performed (for example, the center of the specimen, X μm from the specimen surface, or the like) has already been determined, an image having that depth may be selected.

In Step S808, the range (depth range) of the layer images used to generate the analysis image is designated. The depth range is set such that the reference position designated in S807 forms an upper end, a center, or a lower end of the depth range. The depth range may be designated by the user, but is preferably determined automatically by the image processing apparatus 102 in accordance with the size of the analysis subject, the aim of the analysis, and so on. For example, when calculating the N/C ratio, which is the area ratio between the cytoplasm and the nucleus, during a tissue diagnosis, the depth range is preferably set at not less than 3 μm and not more than 10 μm, taking into account that a diameter of the nucleus is between approximately 3 and 5 μm in a normal cell and expands to approximately several times that as a result of nuclear enlargement and multinucleation. Further, in the case of a cytological diagnosis, the aim is usually to obtain an overall picture of an exfoliated cell having a size (thickness) of approximately several tens of μm in order to grasp the cell shape, and therefore the depth range is preferably set at approximately 20 μm. It is assumed that correspondence relationships between the size of the desired depth range and the analysis subject and analysis aim are set in advance in the image processing apparatus 102.

Further, in Step S808, the Z direction interval (Z interval) between the images to be used during focus stacking may be set in addition to the depth range. For example, the depth range used during a cytological diagnosis is larger than that of a tissue diagnosis, and therefore, when all of the images in the depth range are used for focus stacking, the processing time increases. Hence, by increasing the Z interval in cases where the depth range is large, the size of the analysis subject is large, and so on, the number of images is reduced, leading to a reduction in processing time.

In Step S809, the image processing apparatus 102 selects the plurality of layer images included in the depth range set in S807 and S808. In Step S810, the image processing apparatus 102 implements focus stacking processing using the selected layer images. The focus stacking processing is identical in content to that of Step S805, and will be described below using FIG. 7.

In Step S811, the image processing apparatus 102 designates the focus-stacked image generated in Step S810 as the analysis image. The analysis image is then stored in the internal storage device of the image processing apparatus 102 or a predetermined storage device on a network.

As a result of the processing described above, both the observation image and the analysis image can be obtained from identical Z-stack images (a layer image group).

(Focus Stacking Processing)

Figure 7:
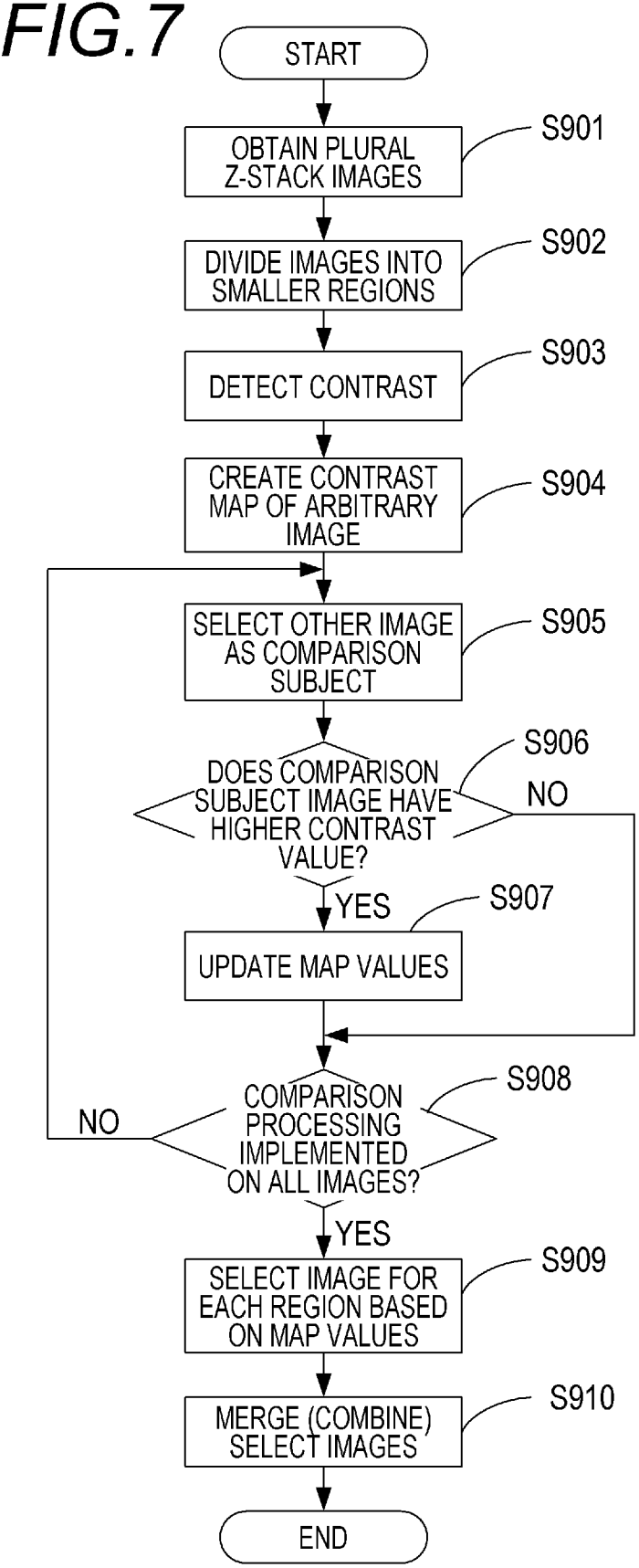
FIG. 7 is a flowchart showing a flow of focus stacking processing according to the first embodiment.

FIG. 7 is a flowchart showing a flow of the focus stacking processing. Here, Steps S805 and S810 of FIG. 6 will be described in detail.

In Step S901, the image processing apparatus 102 obtains the plurality of layer images selected as focus stacking subjects. As described above, a larger number of images is used during focus stacking of the analysis image than during focus stacking of the observation image.

In Step S902, the image processing apparatus 102 divides each of the obtained images into a plurality of small regions of a predetermined size. The size of the divided region is determined taking into account the size of the structure (cell, nucleus, or the like) to be subjected to observation or analysis. For example, the size of the divided region is preferably set such that a length of one side of the divided region is between approximately half the diameter and the entire diameter of the observation or analysis subject structure.

In Step S903, the image processing apparatus 102 detects a contrast value in relation to each divided region of each image. A method of determining frequency components by performing a discrete cosine transform in each divided region, determining a sum of high frequency components within the frequency components, and using this sum as a value expressing a degree of contrast may be cited as an example of contrast detection. More simply, a difference between a maximum value and a minimum value of brightness values in the divided region may be determined as the contrast value, or a value obtained by calculating an edge amount using an edge detection spatial filter may be set as the contrast value. Various known methods may be applied to contrast detection.

In Step S904, the image processing apparatus 102 creates a contrast map. The contrast map is a table having an identical number of elements to the number of divided regions. A contrast value and an image number of a corresponding divided region are mapped to each element as map values. For example, in a case where the image is divided into 100×100 regions in S902, the contrast map has 100×100 elements. In Step S904, an arbitrary image (the image on the upper end of the depth range or the like, for example) is selected from the plurality of images obtained in S901, and the contrast value and image number of the image are input into the contrast map as initial values.

In Step S905, the image processing apparatus 102 selects a different image to the image selected in Step S904 as a comparison subject image.

In Step S906, the image processing apparatus 102 compares the contrast values of the comparison subject image and the contrast map. When the contrast value of the comparison subject image is larger, the routine advances to Step S907. When the contrast value of the comparison subject image is smaller or when the contrast values of the two images are identical, the routine skips the processing of Step S907 and advances to Step S908.

In Step S907, the image processing apparatus 102 writes the contrast value and image number of the comparison subject image to the contrast map (updates the contrast map). The contrast value comparison of S906 and updating of the contrast map in S907 are performed for each divided region.

In Step S908, the image processing apparatus 102 determines whether or not the comparison processing has been implemented on all of the images selected in Step S901. When the comparison processing has been performed on all of the images, the routine advances to Step S909. When the processing is not complete, the routine returns to Step S905, where the comparison processing is repeated. As a result, the number of the image having the highest contrast value is recorded for each divided region on the completed contrast map.

In Step S909, the image processing apparatus 102 extracts a divided image from the layer image having the corresponding image number in each divided region by referring to the contrast map.

In Step S910, the image processing apparatus 102 implements stitching processing to merge the divided images extracted in Step S909. By performing the steps described above, a combined image merging high contrast regions, or in other words sharp, focused regions, can be generated from the plurality of layer images.

(Image Analysis Processing)

Figure 8:
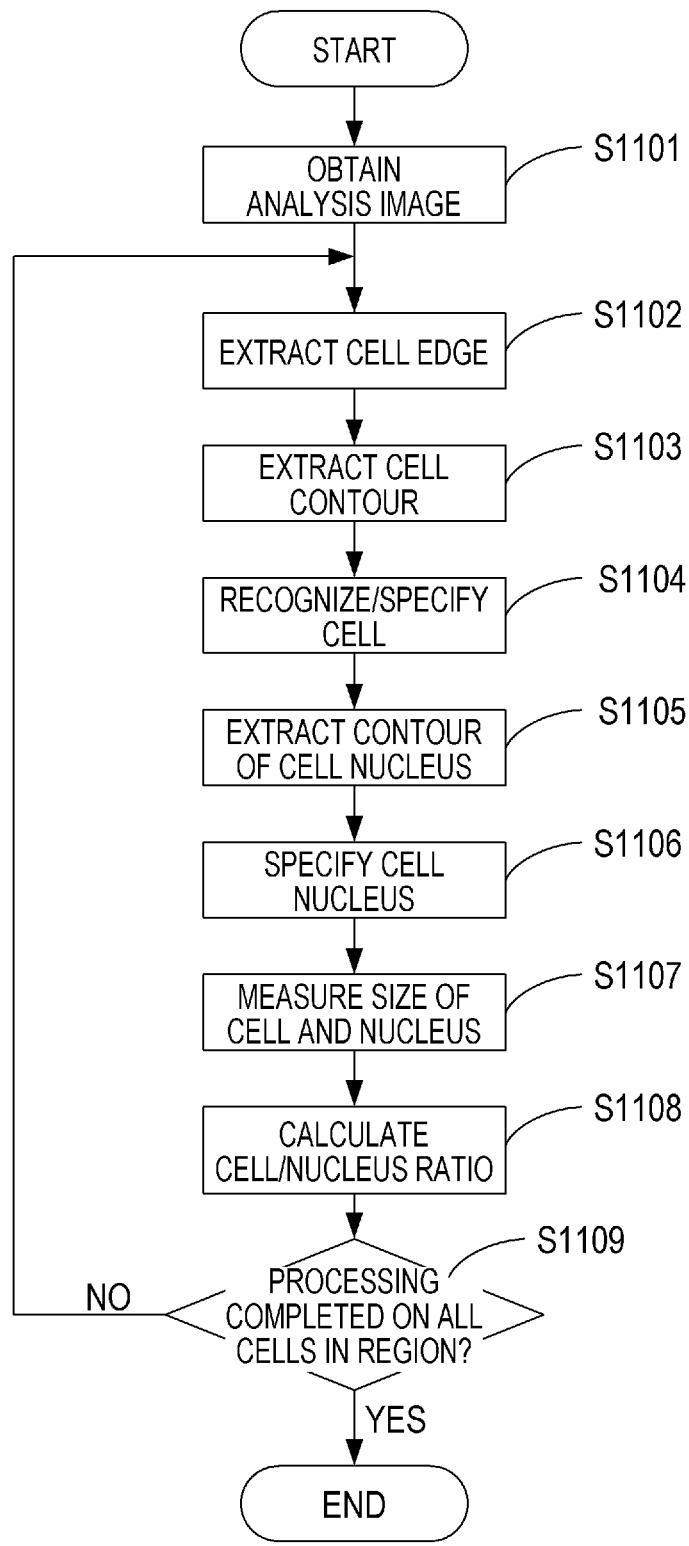
FIG. 8 is a flowchart showing a flow of image analysis according to the first embodiment.

FIG. 8 is a flowchart showing a flow of image analysis. Here, Step S712 of FIG. 5 will be described in detail.

In Step S1101, the image processing apparatus 102 obtains the analysis image subjected to focus stacking for the purpose of analysis. Here, a tissue diagnosis will be described as an example, and accordingly, a thinly sliced, HE (hematoxylin and eosin) stained tissue fragment is used as the specimen.

In Step S1102, the image processing apparatus 102 extracts edges of a cell serving as the analysis subject included in the analysis image. Here, processing is performed to extract regions having a red to pink color gamut, using the fact that the cell is stained red to pink by the eosin. In the analysis image according to this embodiment, image blur is reduced by the focus stacking, and therefore edge extraction and subsequent contour extraction can be performed with a high degree of precision. Note that in order to perform the extraction processing with an even higher degree of precision, edge emphasis processing using a spatial filter may be implemented on the analysis image in advance. The edge extraction described here is, in actuality, cell membrane detection.

In Step S1103, the image processing apparatus 102 extracts cell contours on the basis of the edges extracted in Step S1102. When the edges extracted in Step S1102 are discontinuous and intermittent, a continuous contour can be extracted by implementing processing to connect the edges. A typical linear interpolation method may be used to connect the discontinuous edges, but to achieve greater precision, a high order interpolation method may be used.

In Step S1104, the image processing apparatus 102 recognizes and specifies individual cells on the basis of the contours detected in Step S1103. A cell is typically circular and the size thereof is more or less fixed. Therefore, erroneous determinations of cells can be reduced by using knowledge information such as shape and size. Further, in this embodiment, the depth range used to generate the analysis image is set at an appropriate range on the basis of the size of the nucleus of the cell, and therefore overlap of cells existing at different depths on the image is minimized. The processing to recognize and specify the cells can therefore be performed with a high degree of precision. Note that the possibility of partial cell overlap remains, and therefore cell specification may be difficult. In this case, the recognition and specification processing may be implemented again after receiving a result of subsequent cell nucleus specification processing.

In Step S1105, the image processing apparatus 102 extracts the contours of the cell nuclei. In HE staining, the nucleus of the cell is stained violet by the hematoxylin and the peripheral cytoplasm is stained red by the eosin. Hence, in Step S1105, processing is performed to detect a part having a violet central part and a red periphery and extract a boundary between the violet region and the red region.

In Step S1106, the image processing apparatus 102 specifies the cell nucleus on the basis of the contour information detected in Step S1105. In a normal cell, the nucleus typically has a size of approximately 3 to 5 μm, but when an abnormality occurs, various changes such as size enlargement, multinucleation, and deformation occur. One indication of the existence of the nucleus is that it exists in the cell specified in Step S1104. Cells that could not easily be specified in Step S1104 can be determined by specifying the nucleus.

In Step S1107, the image processing apparatus 102 measures the sizes of the cells and the cell nuclei specified in Step S1104 and Step S1106. Here, the size means the surface area, and therefore the surface area of the cytoplasm in the cell membrane and the interior surface area of the nucleus are respectively determined. Further, the total number of cells may be counted, and statistical information relating to the shapes and sizes thereof may be obtained.

In Step S1108, the image processing apparatus 102 calculates the N/C ratio, which is the area ratio between the cytoplasm and the nucleus, on the basis of the surface area information obtained in Step S1107. Statistical information relating to the calculation results of the individual cells is then obtained.

In Step S1109, the image processing apparatus 102 determines whether or not analysis processing has been performed on all of the cells within the range of the analysis image, or in certain cases a range designated by the user. When the analysis processing is complete, the overall processing is complete. When the analysis processing is not complete, the routine returns to Step S1102, from where the analysis processing is repeated.

By performing the steps described above, image analysis useful for diagnostic support can be implemented.

Advantages of this Embodiment

According to this embodiment, as described above, two images, namely the observation image and the analysis image, can be generated on the basis of a plurality of layer images having different focal positions. The observation image has a shallower depth of field than the analysis image, and therefore structures (cell, nuclei, and the like) removed from the depth of field form blurred images on the image. When the user views the image visually, the blurred images serve as depth information enabling the user to grasp the three-dimensional structure and three-dimensional distribution of the object. With regard to the analysis image, on the other hand, overlap of the analysis subjects on the image can be minimized by performing focus stacking in an appropriate range corresponding to the size of the analysis subject and the aim of the analysis, and therefore image analysis processing can be performed easily and precisely. Hence, with the system according to this embodiment, two images can be generated from identical Z-stack images (a layer image group) in accordance with the application and aim, and therefore an improvement in user-friendliness can be achieved.

Further, the focus stacking is performed using a plurality of layer images, and therefore artifacts are less likely to appear in comparison with an image obtained simply by applying depth recovery processing such as edge emphasis on a single-depth image having a shallow depth of field. As a result, a high-quality image that can be used to provide a precise diagnosis can be generated. Moreover, the Z-stack images can be obtained by a simple process of moving a stage or an imaging device carrying the specimen in the optical axis direction, and an imaging apparatus including such a mechanism can be realized comparatively easily.

Furthermore, in this embodiment, focus stacking is performed using a select and merge method, and this method involves simpler processing than other methods, such as a spatial frequency filtering method to be described in a third embodiment. As a result, a circuit scale and a calculation amount can also be suppressed.

Note that in this embodiment, the image generation and image analysis processing is performed by the image processing apparatus 102 after the Z-stack images are captured by the imaging apparatus 101, but the processing procedures are not limited thereto, and by linking the imaging apparatus 101 and the image processing apparatus 102, imaging can be performed at a required timing. For example, when it is determined that the layer images required by the image processing apparatus 102 to generate an image suitable for the aim are insufficient or nonexistent, the imaging apparatus 101 can be notified of the required imaging range (XY range, Z position, and Z interval). In so doing, image acquisition can be performed in a shorter imaging time and with a smaller data amount.

Second Embodiment

An image processing system according to a second embodiment of the present invention will now be described using the drawings.

In the first embodiment, an example in which the layer images used to generate the observation image and the analysis image are obtained as required by the imaging apparatus was described. In the second embodiment, an example in which the layer images are obtained in advance and the image processing apparatus obtains required layer images from an image server during image generation will be described. The second embodiment also differs from the first embodiment in that pre-processing relating to image stacking is varied between a cytological diagnosis and a tissue diagnosis. The following description focuses on these differences.

Figure 9:
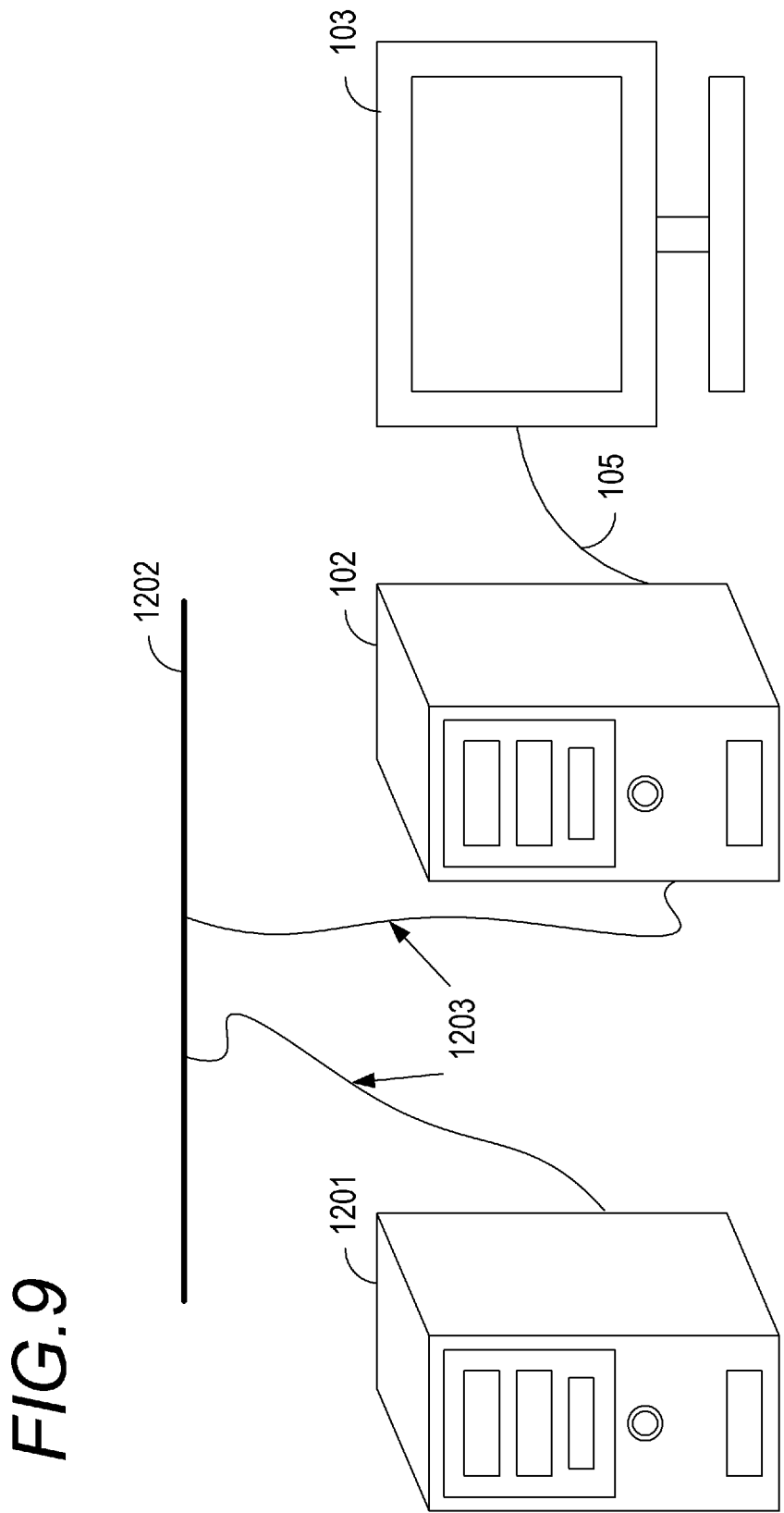
FIG. 9 is an overall view showing a layout of apparatuses in an image processing system according to a second embodiment.

FIG. 9 is an overall view showing a layout of apparatuses in the image processing system according to the second embodiment.

The image processing system according to this embodiment includes an image server 1201, the image processing apparatus 102, and the display device 103. The image processing apparatus 102 is capable of obtaining a two-dimensional image (a layer image) of a specimen from the image server 1201 and displaying the obtained image. The image server 1201 and the image processing apparatus 102 are connected to each other by a general-purpose I/F LAN cable 1203 via a network 1202. The image server 1201 is a computer having a large-capacity storage device that stores Z-stack images captured by an imaging apparatus (a virtual slide apparatus). The image server 1201 stores, in addition to image data, data relating to pre-measurement performed by the imaging apparatus. The image processing apparatus 102 and the display device 103 are similar to those of the first embodiment.

In the example shown in FIG. 9, the image processing system is constituted by three apparatuses, namely the image server 1201, the image processing apparatus 102, and the display device 103, but the present invention is not limited to this layout. For example, an image processing apparatus having an integrated display device may be used, or the functions of the image processing apparatus may be incorporated into the image server. Further, the functions of the image server, the image processing apparatus, and the display device may be realized by a single apparatus. Conversely, the functions of the image server and the image processing apparatus may be divided among a plurality of apparatuses.

(System Operations)

Figure 10:
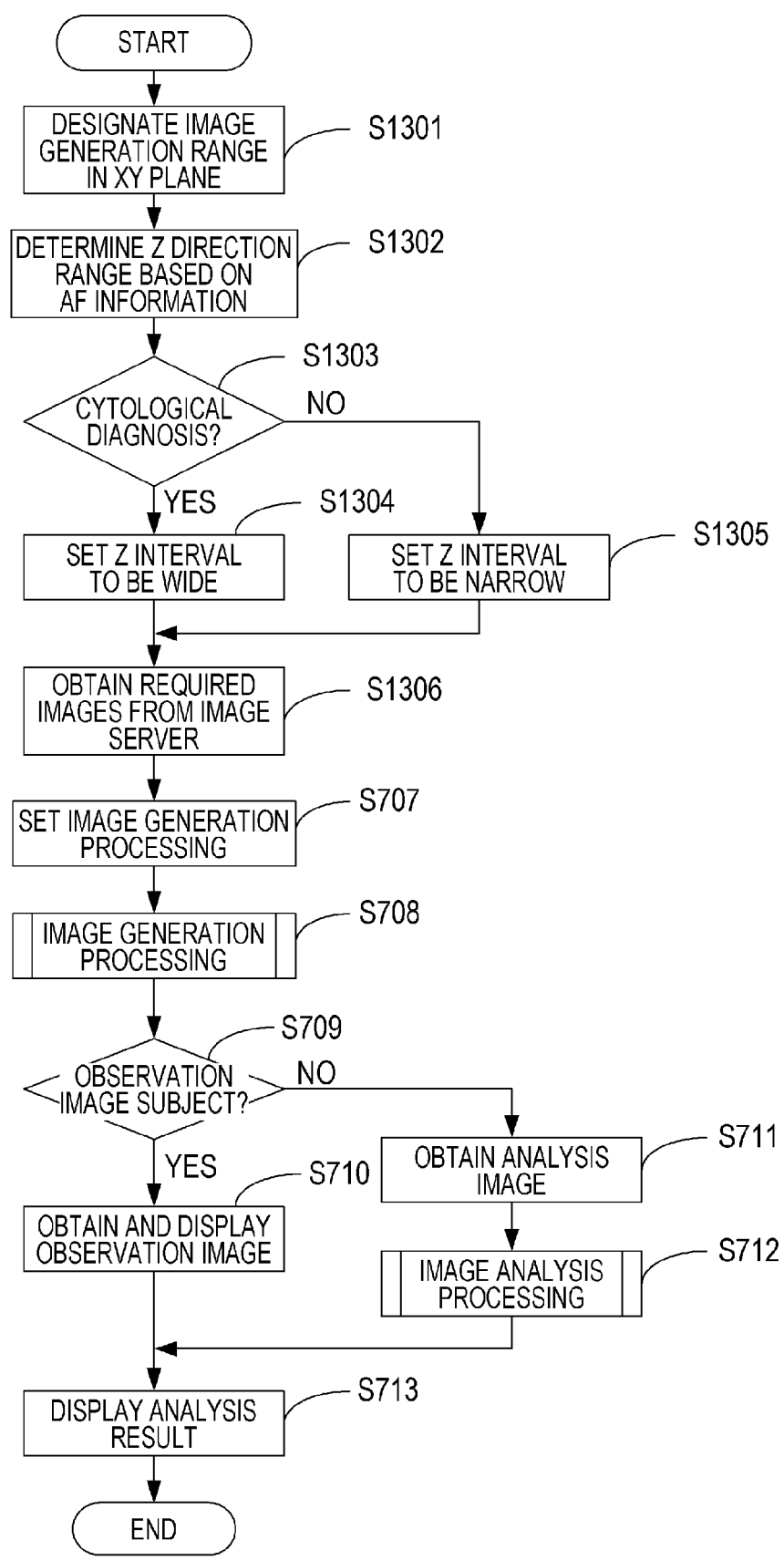
FIG. 10 is a flowchart showing an overall flow of image processing according to the second embodiment.

FIG. 10 is a flowchart showing an overall flow of image processing performed by the image processing apparatus. The flow of processing for generating the observation image and the analysis image, which is a feature of this embodiment, will now be described using this drawing. Note that similar processes to the first embodiment have been allocated identical reference symbols, and description thereof has been omitted.

In Step S1301, the image processing apparatus 102 reads an arbitrary image (for example, an image having an uppermost focal position) from the layer image group relating to the subject specimen to be used for image generation from the image server 1201, and displays a preview of the image on the display device 103. The user is then asked to designate an XY range (a range required to create the observation image and the analysis image) in which the observation and analysis subject structure exists on the preview image.

In Step S1302, the image processing apparatus 102 determines an imaging range in the Z direction (optical axis direction) of the layer image to be used for image generation on the basis of AF information relating to the layer image group. The AF information is information relating to the focal position of each image, which is created during imaging using an auto-focus function (for example, a function for detecting a focal point using a frequency component or a contrast value of an image) of the imaging apparatus. In this embodiment, the AF information is stored in the image server 1201 together with the layer image group.

In Step S1303, the image processing apparatus 102 determines whether the subject specimen is to be used in a cytological diagnosis or a tissue diagnosis. The user may be asked to designate a cytological diagnosis or a tissue diagnosis, but the image processing apparatus 102 is capable of determining a cytological diagnosis or a tissue diagnosis automatically from the thickness and the staining method of the subject specimen. The thickness of the specimen is typically between approximately 4 and 5 μm in a tissue diagnosis and at least several tens of μm in a cytological diagnosis. As regards staining, meanwhile, HE staining is typically used in a tissue diagnosis, whereas Papanicolaou staining is typically used in a cytological diagnosis, and it is therefore possible to infer from the tinge of the specimen whether a tissue diagnosis or a cytological diagnosis is to be performed. Note that information indicating the specimen thickness may be stored in the image server 1201 or estimated from the AF information obtained in Step S1302. Further, information indicating the staining method (or the tinge) may be stored in the image server 1201 or obtained by the image processing apparatus 102 during the image processing. When a cytological diagnosis is determined, the routine advances to Step S1304, and when a tissue diagnosis is determined, the routine advances to Step S1305.

In Step S1304, the image processing apparatus 102, having received notification of a cytological diagnosis, sets the Z interval of the selected images to be wide. The reason for this is that in a cytological diagnosis, the thickness is several tens of μm. By widening the Z interval (to between 1 and several μm, for example) in comparison with that of a tissue diagnosis, the number of layer images used for focus stacking can be reduced, and as a result, the processing time can be shortened.

In Step S1305, the image processing apparatus 102, having received notification of a tissue diagnosis, sets the Z interval of the selected images to be narrow. The reason for this is that in a tissue diagnosis, the specimen thickness is only approximately several μm. When an NA of the imaging optical system of the imaging apparatus 101 is approximately 0.7, the depth of field is approximately ±0.5 μm, and even then the specimen thickness is larger. Hence, to obtain a sharp image, the Z interval is preferably set at approximately 0.5 μm.

In Step S1306, the image processing apparatus 102 obtains the required layer images from the image server 1201 in accordance with the Z range designated in S1302 and the Z interval designated in Step S1304 or S1305. The observation image and the analysis image are then generated using similar processing to the first embodiment, whereupon required processing is performed on the respective images (S607 to S613).

As described above, according to this embodiment, similarly to the first embodiment, two images, namely the observation image and the analysis image, can be generated from identical Z-stack images (the layer image group), enabling an improvement in user-friendliness. In this embodiment in particular, the observation image and the analysis image are generated on the basis of images obtained in advance, and therefore a desired image can be obtained without taking the imaging time required by the imaging apparatus into account. Further, the Z interval of the images used for focus stacking can be adjusted automatically depending on whether a tissue diagnosis or a cytological diagnosis is to be performed, and therefore the processing time of a cytological diagnosis can be shortened. Moreover, a further improvement in convenience can be provided by determining whether a tissue diagnosis or a cytological diagnosis is to be performed automatically.

Third Embodiment

A third embodiment of the present invention will now be described. In the above embodiments, focus stacking is performed using a select and merge method, but in the third embodiment, focus stacking is implemented using a spatial frequency filtering method in which original images are added together in a spatial frequency region.

FIG. 11 is a flowchart showing a flow of focus stacking processing. FIG. 11 shows in detail the content of Steps S805 and S810 in FIG. 6 of the first embodiment. In the first embodiment, divided images are selected and merged by comparing contrast values. In this embodiment, processing (also referred to as depth recovery) for enlarging the depth of field by performing image stacking and recovery in a frequency region using a plurality of images will be described.

In Step S1401, the image processing apparatus 102 obtains a plurality of layer images to be subjected to depth recovery processing.

In Step S1402, the image processing apparatus 102 divides the obtained images respectively into a plurality of regions of a predetermined size.

In Step S1403, the image processing apparatus 102 selects images to be used for focus stacking in each divided region. Similarly to the first and second embodiments, in the case of the observation image, a plurality of images are selected in a range where depth information is preserved, while in the case of the analysis image, the number of images to be selected is determined in consideration of the thickness range in which overlap between the cells and nuclei serving as the analysis subjects is at a minimum. Image selection is based on a pre-designated region range and the pre-measurement results.

In Step S1404, the image processing apparatus 102 applies a Fourier transform to the divided images selected in Step S1403. Although a Fourier transform is cited here as an example of a spatial frequency transform, other frequency transform processing such as a discrete cosine transform may be used instead.

In Step S1405, the image processing apparatus 102 determines whether or not the Fourier transform has been applied to all of the images. When the Fourier transform has been applied to all of the images, the routine advances to Step S1406. When an image to which the Fourier transform has not yet been applied exists, the routine returns to Step S1404, where the transform processing is applied to the next image.

In Step S1406, the image processing apparatus 102, having received notification that the frequency transform processing has been completed on all of the divided images, adds together frequency components of divided images in identical positions on the XY plane while applying appropriate weightings thereto.

In Step S1407, the image processing apparatus 102 generates a focused image by subjecting a Fourier spectrum (image information) obtained from the weighted addition to an inverse Fourier transform. Here, an inverse transform from a frequency region to a spatial region is envisaged.

In Step S1408, the image processing apparatus 102 applies filter processing such as edge emphasis, smoothing, and noise removal as required. Note that this step may be omitted.

As described above, in this embodiment, similarly to the first embodiment, two images, namely the observation image and the analysis image, can be generated from identical Z-stack images (the layer image group), enabling an improvement in user-friendliness. With the spatial frequency filtering method of this embodiment in particular, a plurality of images are added together in a frequency region rather than exclusively selecting the image having the highest contrast value, as in the select and merge method, and therefore a high-quality image can be generated.

Other Embodiments

The object of the present invention may be achieved as follows. A recording medium (or a storage medium) recorded with program code of software for realizing all or a part of the functions of the embodiments described above is supplied to a system or an apparatus. A computer (or a CPU or MPU) of the system or the apparatus then reads and executes the program code stored in the recording medium. In this case, the program code read from the recording medium realizes the functions of the above embodiments, while the recording medium recorded with the program code constitutes the present invention.

Further, by having the computer execute the read program code, an operating system (OS) or the like that runs on the computer performs all or a part of the actual processing on the basis of instructions included in the program code. A case in which the functions of the above embodiments are realized by this processing is also included in the present invention.

Furthermore, the program code read from the recording medium is written to a memory included in a function expansion card inserted into the computer or a function expansion unit connected to the computer. A CPU or the like included in the function expansion card or function expansion unit then performs all or a part of the actual processing on the basis of instructions included in the program code, and a case in which the functions of the above embodiments are realized by this processing is also included in the present invention.

When the present invention is applied to the recording medium described above, program code corresponding to the flowcharts described above is stored in the recording medium.

Further, in the first to third embodiments, an example in which two images, namely the observation image and the analysis image, are generated from a plurality of layer images having different focal positions relative to the specimen was described, but the present invention is not limited thereto. For example, when the observation image is not required (or when a layer image is used as is), the analysis image may be generated alone. Furthermore, by controlling an aperture value of the imaging optical system of the imaging apparatus rather than enlarging the depth of field through focus stacking, an image having an enlarged depth of field can be obtained in accordance with the application. Moreover, depth of field enlargement can be performed on the analysis image by applying a typical depth recovery technique in which a single image and information indicating the distance to the specimen are obtained instead of a plurality of layer images and a PSF (point spread function) is estimated on the basis of the distance information.

Further, the constitutions described in the first to third embodiments may be combined with each other. For example, the focus stacking processing of the third embodiment may be applied to the systems of the first and second embodiments, and the image processing apparatus may be connected to both the imaging apparatus and the image server so that an image to be used in the processing can be obtained from either apparatus. Other constitutions obtained by appropriately combining the various techniques described in the above embodiments also belong to the scope of the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-155889, filed on Jul. 14, 2011, which is hereby incorporated by reference herein in its entirety.

What is claimed is:

1. An image processing apparatus comprising:
an image sensor, for acquiring a plurality of original images by imaging a specimen including a structure while changing a focal position of a microscope apparatus within an imaging range in an optical axis direction;
an image analyzer, for obtaining information relating to the structure included in an image by applying image analysis processing to the image; and
an image generator, for generating, on the basis of the plurality of original images, a first image to be used for the image analysis processing by said image analyzer and a second image to be used for visual observation by a user,
wherein said image generator sets up a first depth range within the imaging range, the first depth range being narrower than the imaging range, selects only those original images whose focal positions are included within the first depth range out of the plurality of original images obtained from the specimen, and generates the first image using only the selected original images, and
wherein said image generator sets up a second depth range within the imaging range, the second depth range being narrower than the first depth range, selects only those original images whose focal positions are included within the second depth range out of the plurality of original images obtained from the specimen, and generates the second image using only the selected original images.

2. The image processing apparatus according to claim 1, wherein said image generator determines a size of the first depth range to be approximately equal to a size of the structure to be analyzed in the image analysis processing.

3. The image processing apparatus according to claim 2, wherein said image generator determines the size of the first depth range, depending on whether the specimen is for a tissue diagnosis or for a cytological diagnosis, so that the depth range of the specimen for a tissue diagnosis is narrower than that of the specimen for a cytological diagnosis.

4. The image processing apparatus according to claim 2, wherein, when the specimen is to be used in a tissue diagnosis, said image generator sets the size of the first depth range, in which the original images used to generate the first image are selected, at not less than 3 μm and not more than 10 μm.

5. The image processing apparatus according to claim 1, wherein the depth range in which the original images used to generate the first image are selected, is designated by a user.

6. The image processing apparatus according to claim 1, wherein said image generator generates the first image by performing focus stacking processing using the selected original images.

7. The image processing apparatus according to claim 6, wherein said image generator generates the first image by dividing the original images into a plurality of regions, selecting an image having highest contrast value from among the selected original images in each divided region, and merging the images selected in each divided region with each other.

8. Image processing apparatus according to claim 6, wherein said image generator generates the first image by dividing the original images into a plurality of regions and adding the selected original images together in a spatial frequency region in each divided region.

9. The image processing apparatus according to claim 1, wherein the structure is a cell.

10. The image processing apparatus according to claim 9, wherein information relating to the structure obtained by said image analyzer is at least any of a cell contour, a nucleus contour, a cell count, a cell shape, a cytoplasm surface area, a nucleus surface area, and an area ratio between the cytoplasm and the nucleus.

11. The image processing apparatus according to claim 1, wherein the structure is a nucleus.

12. The image processing apparatus according to claim 1, wherein the second image is an image on which blur has been reduced to a smaller extent than the first image.

13. The image processing apparatus according to claim 12, wherein the second image is an image to be used for visual observation by a user.

14. The image processing apparatus according to claim 12, further comprising a unit for outputting the information relating to the structure obtained by said image analyzer together with the second image to a display device.

15. An imaging system comprising:
a microscope apparatus for obtaining a plurality of original images by imaging a specimen including a structure in various focal positions; and
the image processing apparatus according to claim 1, which obtains the plurality of original images from said microscope apparatus.

16. The imaging system according to claim 15, wherein said microscope apparatus includes a measurement unit for measuring a thickness of the specimen.

17. The imaging system according to claim 16, wherein said microscope apparatus determines an imaging start position, from which the plurality of original images are obtained, on the basis of a measurement result from said measurement unit.

18. The imaging system according to claim 15, wherein said microscope apparatus varies an imaging interval, at which the plurality of original images are obtained, as between a case in which the specimen is to be used in a tissue diagnosis and a case in which the specimen is to be used in a cytological diagnosis.

19. An image processing system comprising:
an image server for storing a plurality of original images obtained by imaging a specimen including a structure in various focal positions; and
the image processing apparatus according to claim 1, which obtains the plurality of original images from said image server.

20. A computer program stored on a non-transitory computer-readable medium, the program causing a computer to perform a method comprising the steps of:
acquiring a plurality of original images acquired by imaging a specimen including a structure while changing a focal position of a microscope apparatus within an imaging range in an optical axis direction;
acquiring information relating to the structure included in an image by applying image analysis processing to the image; and
generating, on the basis of the plurality of original images, a first image to be used for the image analysis processing in said information acquiring step and a second image to be used for visual observation by a user,
wherein, in the image generation step, a first depth range is set up within the imaging range, the first depth range being narrower than the imaging range, only those original images whose focal positions are included within the first depth range are selected out of the plurality of original images obtained from the specimen, and the first image is generated using only the selected original images, and
a second depth range is set up within the imaging range, the second depth range being narrower than the first depth range, only those original images whose focal positions are included within the second depth range are selected out of the plurality of original images obtained from the specimen, and the second image is generated using only the selected original images.

* * * * *